United States Patent
Calvin

(10) Patent No.: US 6,203,826 B1
(45) Date of Patent: Mar. 20, 2001

(54) PROCESS FOR MAKING A LOW-ALCOHOL WINE

(75) Inventor: Robert W. Calvin, Fresno, CA (US)

(73) Assignee: Constellation Brands, Inc., Canandaigua, NY (US)

( * ) Notice: Subject to any disclaimer, the term of this patent is extended or adjusted under 35 U.S.C. 154(b) by 0 days.

(21) Appl. No.: 08/215,015

(22) Filed: Mar. 21, 1994

Related U.S. Application Data

(63) Continuation of application No. 07/963,420, filed on Oct. 19, 1992, now abandoned.

(51) Int. Cl.$^7$ ..................................................... C12G 1/00
(52) U.S. Cl. ............................. 426/15; 426/11; 426/592
(58) Field of Search ............................. 426/11, 15, 592, 426/7, 590

(56) References Cited

U.S. PATENT DOCUMENTS

| | | | |
|---|---|---|---|
| 4,156,026 | * 5/1979 | Gogel | 426/15 |
| 4,612,196 | * 9/1986 | Goldstein et al. | 426/15 |
| 4,626,437 | * 12/1986 | Schobinger et al. | 426/592 |
| 4,888,189 | * 12/1989 | Gnekow | 426/592 |
| 4,902,518 | * 2/1990 | Lang et al. | 426/14 |
| 4,942,045 | * 7/1990 | Thumm | 426/11 |
| 4,976,974 | * 12/1990 | Thumm | 426/14 |

* cited by examiner

*Primary Examiner*—Leslie Wong
(74) *Attorney, Agent, or Firm*—McCormick, Paulding & Huber LLP

(57) ABSTRACT

A process for making a low-alcohol wine is provided. The process includes the steps of separating grape juice into a high-sugar fraction and a low-sugar fraction prior to fermentation, blending additional grape juice into the low-sugar fraction to form a mixture and then fermenting the mixture to form a low-alcohol wine. In the case of red wine, a low-alcohol product can also be made by separating the must into a high-sugar fraction and low-sugar fraction prior to fermentation, blending additional must into the low-sugar fraction to form a mixture and then fermenting the mixture to form a low-alcohol red wine. The present invention permits the production of a low-alcohol wine without sacrificing the full body, aroma and character of traditional wine.

8 Claims, 1 Drawing Sheet

PROCESS FOR MAKING A LOW-ALCOHOL WINE

This is a continuation of application Ser. No. 07/963,420 filed Oct. 19,1992, now abandoned.

BACKGROUND OF THE INVENTION

It is desirable in today's marketplace to produce a dry table wine with a low-alcohol concentration (4% to 10% by weight) to meet the demands of a health conscious public. Ideally, these wines should not sacrifice full body, aroma and character when compared to traditional table wines. Such low-alcohol wines are sometimes referred to as "light wines."

Traditional table wine is made by crushing grapes to produce a mass, referred to by those skilled in the art as must, which includes grape skins, seeds (assuming a seeded variety), water, invert sugar and a number of organic compounds which contribute to the character and quality of the final product, such as the aroma, bouquet and flavor of the wine. To make red wine the entire must is fermented. This is necessary because the color pigments which give the wine its red color are primarily found in the grape skins. Alternatively, the red must can be heated with the addition of an extraction agent such as, for example, $SO_2$ to extract the color pigments. The must is then separated into a juice fraction colored red from the pigments extracted from the skins and a solids fraction, commonly referred to as pomace, containing the skins, seeds and trace amounts of sugar and water. After separation, most of the organic compounds mentioned above are in the grape juice fraction and are intact. The juice fraction is then fermented to produce a red wine.

In the case of blush wines and particularly in the case of white wines, the color pigments found in the grape skins must be removed early in the wine-making process to control coloring of the wine. Accordingly, prior to fermentation, the must is separated into a grape juice fraction and pomace. The separation is carried out in a settling tank, and that portion of the grape juice which cannot be removed by gravity separation is obtained by pressing or squeezing the skins and seeds in a wine press. After separation, most of the organic compounds referred to above are in the grape juice fraction and are intact.

Once the juice has been separated, it is ready to be fermented. Fermentation is usually carried out in a batch fermentation vessel, and the temperature is controlled to produce an isothermal fermentation. The temperature setpoint is usually set between 55 and 65 degrees Fahrenheit. If, for example, it is assumed that the maturity of the grapes was such that the juice contained 19% invert sugar by weight prior to fermentation, and the fermentation was carried out to dryness (0% sugar), the resultant wine would contain 9.71% alcohol by weight based on a stoichiometric balance using the Gay-Lussac equation. In "The Technology of Wine Making", Third Edition. by Amerine, Berg, and Cruess, researchers report actual alcohol yields of 90 to 95 percent of theoretical yields. Assuming this to be true, Table I shows the expected and theoretical alcohol concentrations for various grape maturities. All data in Table I is shown in percent by weight (by volume).

TABLE I

| Sugar | Theoretical Alcohol | Actual Alcohol Yield |
|---|---|---|
| 16.00 | 8.17 (10.08) | 7.35–7.76 (9.09–9.58) |
| 17.00 | 8.68 (10.70) | 7.81–8.24 (9.64–10.16) |
| 18.00 | 9.20 (11.32) | 8.28–8.74 (10.21–10.77) |
| 19.00 | 9.71 (11.93) | 8.73–9.22 (10.76–11.35) |
| 20.00 | 10.22 (12.54) | 9.19–9.71 (11.31–11.93) |
| 21.00 | 10.73 (13.15) | 9.66–10.20 (11.87–12.52) |
| 22.00 | 11.24 (13.76) | 10.10–10.68 (12.40–13.09) |

The microbiological processes that occur during fermentation produce trace amounts of organic compounds which further add to the character and quality of the wine. This so where the must is directly fermented to produce red wine and in the case where the grape juice is first separated from the must and then fermented to produce a red, white or blush wine. A more complete discussion of the chemistry of fermentation and the composition of wines can be found in "Technology of Wine Making", by Amerine, Berg, and Cruess, Third Edition, pages 177 to 244. Once the traditional wine is fermented, it is fined, filtered, processed, and bottled for the consumer.

Existing methods of making low-alcohol wines fall into two categories. The first method involves picking grapes with a very low-sugar content and fermenting the juice as described above. This method does not produce a good quality product, because the grape has not fully matured. The second method is to take traditional wines and fractionate them into a low-alcohol portion, and a high-alcohol portion. This second method is discussed below.

Wine may be thought of in simplistic terms as a water-alcohol mixture which can be separated into a high-alcohol fraction and a low-alcohol fraction. The low-alcohol fraction becomes the low-alcohol wine. Many different processes can be used to do the fractionation including, vacuum distillation, pressure distillation, thin filmed evaporation under reduced pressured, or reverse osmosis. Most commercially made low-alcohol wines are made in this fashion.

The problem with this method of manufacture is that all of the fractionation processes available today partially remove, destroy, or separate into the wrong fraction the organic compounds whose presence determines to a large extent the character and quality of the product. As discussed above these compounds are generated in the fermentation or are present in the original must or grape juice. Experienced wine tasters will often describe the resultant product as containing a "processed character" or "cooked" taste when compared to traditional wine made from the same must or grape juice. The low-alcohol wine will lack fruitiness, bouquet, aroma, and character. It is low in quality.

SUMMARY OF THE INVENTION

The present invention relates to a novel process for making low-alcohol wines without picking grapes having a low-sugar level or processing traditional wines through fractionation processes. According to the process, the must, in the case of red wine, or the grape juice fraction, in the case of white wine, blush wine or red must treated with heat and S02, is split into a high-sugar fraction and a very low-sugar fraction having only a trace of sugar, prior to fermentation. That is, the high sugar fraction contains more sugar on a percentage weight basis than the grape juice and the low sugar fraction contains less sugar on a percentage weight basis than the grape juice. Additional fresh must or grape juice, respectively, is then blended into the low-sugar fraction to form a mixture that contains less sugar, on a percent weight basis, than the original must or grape juice fraction. The resultant mixture is then fermented to produce a wine having a low-alcohol concentration. The invention allows the production of such a wine without losing the compounds contained in the original must or grape juice fraction and generated during fermentation which contribute to the wine's character and quality.

DETAILED DESCRIPTION OF THE INVENTION

Figure 1:
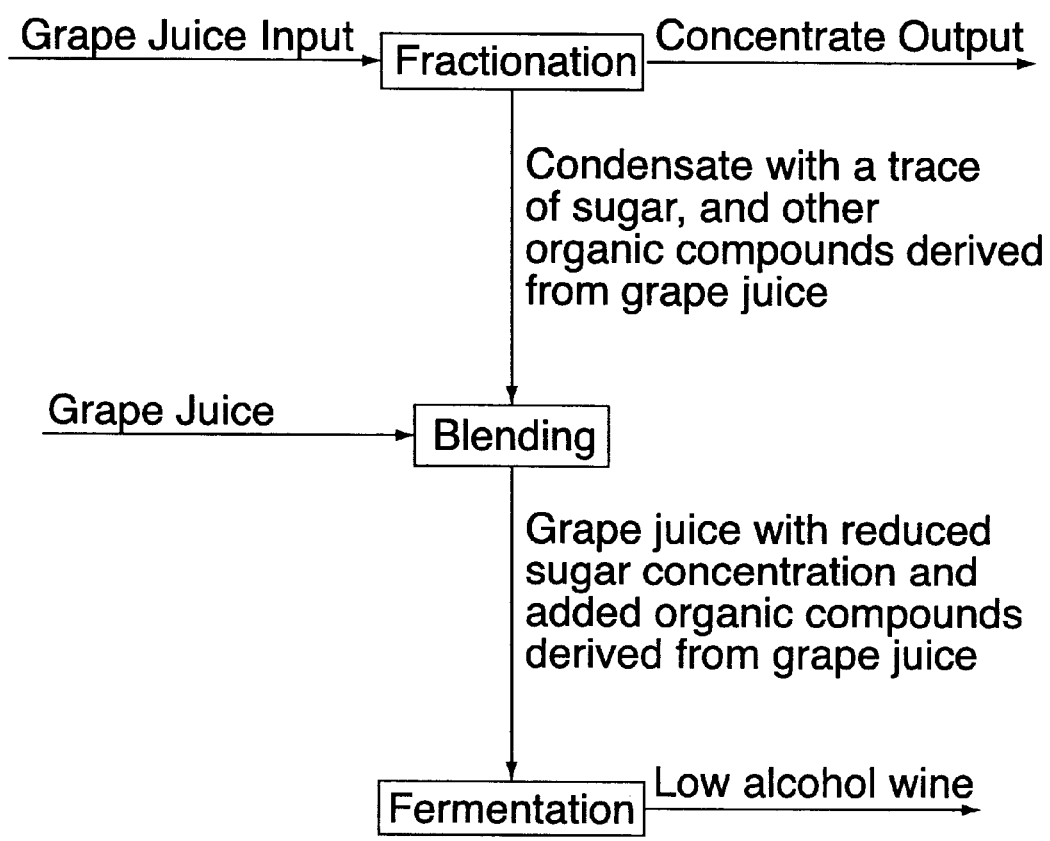
FIG. 1 is a schematic flow diagram illustrating the process of the present invention.

Referring now specifically to the production of low-alcohol white or blush wines, grapes are crushed to form must, and a grape juice fraction is separated from the skins and seeds in a settling tank. To recover juice that cannot be obtained by gravity separation, the skins and seeds are pressed or squeezed in a wine press to recover the last portion of the juice. The recovered grape juice fraction may or may not be centrifuged or filtered at this point in the process to remove small solid particles.

Referring now to FIG. 1, once the grape juice fraction is obtained from the must, it is then separated into a high-sugar fraction commonly called concentrate, and a low-sugar fraction which is called condensate. In addition to having only a trace of sugar, the condensate also includes many of the organic compounds from the grape juice fraction which contribute to the wine's character and quality. Any procedure known to those skilled in the art may be used to separate the grape juice into concentrate and condensate such as, for example, evaporation, freeze concentration, thin film evaporation under reduced pressure and reverse osmosis. Preferably, the separation is carried out by an evaporation process and any type of evaporator equipment familiar to those skilled in the art may be used to make the separation.

After the separation is complete, the condensate portion is blended with additional fresh grape juice to produce a mixture that contains less sugar, on a percent weight basis, than the original grape juice fraction obtained from the must. All material in the mixture, including the organic compounds from the grape juice fraction which contribute to the wine's character and quality, is derived directly from the grape. There is no dilution of the grape juice fraction by adding water, as FIG. 1 illustrates.

In the case of red wine, the entire must is separated into concentrate and condensate. The condensate, containing only a trace of sugar, is then blended with fresh red must to produce a blended red must with less sugar, on a percent weight basis, than the original red must. As with the grape juice used to make a white wine or blush wine, many of the organic compounds which add to the wine's character and quality found in the original must remain in the condensate, and all material in the blended must is derived directly from the grape. No water is added to the must for dilution.

In an alternative method for making a low-alcohol red wine, the must is heated with the addition of $SO_2$ to extract the red pigments from the grape skins. The must is then separated into a red grape juice fraction and pomace, and the grape juice fraction is processed in the same manner described above with regard to the method for making a low-alcohol blush or white wine.

Tables II through VII show some of the unlimited number of blending possibilities for the production of white wine. Of course, the same blending possibilities exist for the production of blush or red wines. The alcohol concentration reported in the tables is calculated from the Gay-Lussac equation. Actual yields will be 90 to 95 percent of these values. It is possible to make just about any alcohol concentration desired. Data in Table IV and VII show it is possible to produce low-alcohol varietal wines, depending on the desired final alcohol concentration and the initial grape juice sugar concentration. A varietal wine, according to the United State's regulation must contain at lest seventy-five (75) percent of the varietal grape to be labeled as a varietal wine.

Table II assumes that 100 pounds of grape juice is made into concentrate at 0.695 weight fraction of sugar, and condensate at 0.0005 weight fraction of sugar is recovered in the fractionation process. The final sugar weight fraction in the blended grape juice is 0.08.

TABLE II

| Weight Fraction Sugar | Concentrate #'s | Condensate #'s | Juice Blending Tank #'s | Juice For Fermented #'s | #'s Wine Made | Alcohol % By Weight/Volume | Condensate % Of Total | Juice % Of Total |
|---|---|---|---|---|---|---|---|---|
| 0.1600 | 22.9662 | 77.0338 | 76.5524 | 153.5862 | 147.5793 | 4.26/5.31 | 50.16 | 49.84 |
| 0.1700 | 24.4060 | 75.5940 | 66.7747 | 142.3686 | 136.8004 | 4.26/5.31 | 53.10 | 46.90 |
| 0.1800 | 25.8459 | 74.1541 | 58.9525 | 133.1066 | 127.9006 | 4.26/5.31 | 55.71 | 44.29 |
| 0.1900 | 27.2858 | 72.7142 | 52.5525 | 125.2667 | 120.3674 | 4.26/5.31 | 58.05 | 41.95 |
| 0.2000 | 28.7257 | 71.2743 | 47.2192 | 118.4935 | 113.8591 | 4.26/5.31 | 60.15 | 39.85 |
| 0.2100 | 30.1656 | 69.8344 | 42.7064 | 112.5408 | 108.1392 | 4.26/5.31 | 62.05 | 37.95 |
| 0.2200 | 31.6055 | 68.3945 | 38.8383 | 107.2328 | 103.0389 | 4.26/5.31 | 63.78 | 36.22 |

Note: The pounds of wine made is less than the pounds of starting juice, due to carbon dioxide loss during the fermentation.

Table III assumes that 100 pounds of grape juice is made into concentrate at 0.695 weight fraction of sugar, and condensate at 0.0005 weight fraction of sugar is recovered in the fractionation process. The final sugar weight fraction in the blended grape juice is 0.10.

Table VI assumes that 100 pounds of grape juice is made into concentrate at 0.675 weight fraction of sugar, and condensate at 0.0004 weight fraction of sugar is recovered in the fractionation process. The final sugar weight fraction in the blended grape juice 0.10.

TABLE III

| Weight Fraction Sugar | Concentrate #'s | Condensate #'s | Juice Blending Tank #'s | Juice For Fermented #'s | #'s Wine Made | Alcohol % By Weight/Volume | Condensate % Of Total | Juice % Of Total |
|---|---|---|---|---|---|---|---|---|
| 0.1600 | 22.9662 | 77.0338 | 127.7478 | 204.7816 | 194.7701 | 5.37/6.67 | 37.62 | 62.38 |
| 0.1700 | 24.4060 | 75.5940 | 107.4514 | 183.0454 | 174.0965 | 5.37/6.67 | 41.30 | 58.70 |
| 0.1800 | 25.8459 | 74.1541 | 92.2291 | 166.3832 | 158.2489 | 5.37/6.67 | 44.57 | 55.43 |
| 0.1900 | 27.2858 | 72.7142 | 80.3896 | 153.1038 | 145.6187 | 5.37/6.67 | 47.49 | 52.51 |
| 0.2000 | 28.7257 | 71.2743 | 70.9179 | 142.1922 | 135.2406 | 5.37/6.67 | 50.13 | 49.87 |
| 0.2100 | 30.1656 | 69.8344 | 63.1684 | 133.0028 | 126.5005 | 5.37/6.67 | 52.51 | 47.49 |
| 0.2200 | 31.6055 | 68.3945 | 56.7105 | 125.1050 | 118.9887 | 5.37/6.67 | 54.67 | 45.33 |

Note: The pounds of wine made is less than the pounds of starting juice, due to carbon dioxide loss during the fermentation.

Table IV assumes that 100 pounds of grape juice is made into concentrate at 0.695 weight fraction of sugar, and condensate at 0.0005 weight fraction of sugar is recovered in the fractionation process. The final sugar weight fraction in the blended grape juice is 0.13.

TABLE IV

| Weight Fraction Sugar | Concentrate #'s | Condensate #'s | Juice Blending Tank #'s | Juice For Fermented #'s | #'s Wine Made | Alcohol % By Weight/Volume | Condensate % Of Total | Juice % Of Total |
|---|---|---|---|---|---|---|---|---|
| 0.1600 | 22.9662 | 77.0338 | 332.5294 | 409.5632 | 383.5332 | 7.10/8.78 | 18.81 | 81.19 |
| 0.1700 | 24.4060 | 75.5940 | 244.7354 | 320.3294 | 299.9707 | 7.10/8.78 | 23.60 | 76.40 |
| 0.1800 | 25.8459 | 74.1541 | 192.0590 | 266.2131 | 249.2938 | 7.10/8.78 | 27.86 | 72.14 |
| 0.1900 | 27.2858 | 72.7142 | 156.9414 | 229.6556 | 215.0597 | 7.10/8.78 | 31.66 | 68.34 |
| 0.2000 | 28.7257 | 71.2743 | 131.8575 | 203.1317 | 190.2216 | 7.10/8.78 | 35.09 | 64.91 |
| 0.2100 | 30.1656 | 69.8344 | 113.0445 | 182.8789 | 171.2559 | 7.10/8.78 | 38.19 | 61.81 |
| 0.2200 | 31.6055 | 68.3945 | 98.4121 | 166.8067 | 156.2052 | 7.10/8.78 | 41.00 | 59.00 |

Note: The pounds of wine made is less than the pounds of starting juice, due to carbon dioxide loss during fermentation.

Table V assumes that 100 pounds of grape juice is made into concentrate at 0.675 weight fraction of sugar, and condensate at 0.0003 weight fraction of sugar is recovered in the fractionation process. The final sugar weight fraction in the blended grape juice 0.07.

TABLE V

| Weight Fraction Sugar | Concentrate #'s | Condensate #'s | Juice Blending Tank #'s | Juice For Fermented #'s | #'s Wine Made | Alcohol % By Weight/Volume | Condensate % Of Total | Juice % Of Total |
|---|---|---|---|---|---|---|---|---|
| 0.1600 | 23.6698 | 76.3302 | 59.1135 | 135.4437 | 130.8086 | 3.70/4.62 | 56.36 | 43.64 |
| 0.1700 | 25.1519 | 74.8481 | 52.1691 | 127.0172 | 122.6704 | 3.70/4.62 | 58.93 | 41.07 |
| 0.1800 | 26.6341 | 73.3659 | 46.4873 | 119.8533 | 115.7516 | 3.70/4.62 | 61.21 | 38.79 |
| 0.1900 | 28.1162 | 71.8838 | 41.7525 | 113.6363 | 109.7474 | 3.70/4.62 | 63.26 | 36.74 |
| 0.2000 | 29.5983 | 70.4017 | 37.7461 | 108.1478 | 104.4467 | 3.70/4.62 | 65.10 | 34.90 |
| 0.2100 | 31.0805 | 68.9195 | 34.3121 | 103.2316 | 99.6988 | 3.70/4.62 | 66.76 | 33.24 |
| 0.2200 | 32.5626 | 67.4374 | 31.3359 | 98.7733 | 95.3930 | 3.70/4.62 | 68.27 | 31.73 |

Note: The pounds of wine made is less than the pounds of starting juice, due to carbon dioxide loss during the fermentation.

TABLE VI

| Weight Fraction Sugar | Concentrate #'s | Condensate #'s | Juice Blending Tank #'s | Juice For Fermented #'s | #'s Wine Made | Alcohol % By Weight/Volume | Condensate % Of Total | Juice % Of Total |
|---|---|---|---|---|---|---|---|---|
| 0.1600 | 23.6585 | 76.3415 | 126.7269 | 203.0685 | 193.1407 | 5.37/6.67 | 37.59 | 62.41 |
| 0.1700 | 25.1408 | 74.8592 | 106.5139 | 181.3731 | 172.5060 | 5.37/6.67 | 41.27 | 58.73 |
| 0.1800 | 26.6232 | 73.3768 | 91.3541 | 164.7310 | 156.6774 | 5.37/6.67 | 44.54 | 55.46 |
| 0.1900 | 28.1055 | 71.8945 | 79.5632 | 151.4577 | 144.0531 | 5.37/6.67 | 47.47 | 52.53 |
| 0.2000 | 29.5879 | 70.4121 | 70.1304 | 140.5425 | 133.6716 | 5.37/6.67 | 50.10 | 49.90 |
| 0.2100 | 31.0703 | 68.9297 | 62.4127 | 131.3425 | 124.9213 | 5.37/6.67 | 52.48 | 47.52 |
| 0.2200 | 32.5526 | 67.4474 | 55.9813 | 123.4287 | 117.3944 | 5.37/6.67 | 54.64 | 45.36 |

Note: The pounds of wine made is less than the pounds of starting juice, due to carbon dioxide loss during the fermentation.

Table VII assumes that 100 pounds of grape juice is made into concentrate at 0.685 weight fraction of sugar, and condensate at 0.0004 weight fraction of sugar is recovered in the fractionation process. The final sugar weight fraction in the blended grape juice is 0.12.

TABLE VII

| Weight Fraction Sugar | Concentrate #'s | Condensate #'s | Juice Blending Tank #'s | Juice For Fermented #'s | #'s Wine Made | Alcohol % By Weight/Volume | Condensate % Of Total | Juice % Of Total |
|---|---|---|---|---|---|---|---|---|
| 0.1600 | 23.3129 | 76.6871 | 229.2945 | 305.9816 | 288.0307 | 6.52/8.08 | 25.06 | 74.94 |
| 0.1700 | 24.7736 | 75.2264 | 179.9416 | 255.1680 | 240.1981 | 6.52/8.08 | 29.48 | 70.52 |
| 0.1800 | 26.2343 | 73.7657 | 147.0396 | 220.8053 | 207.8514 | 6.52/8.08 | 33.41 | 66.59 |
| 0.1900 | 27.6950 | 72.3050 | 123.5382 | 195.8432 | 184.3538 | 6.52/8.08 | 36.92 | 63.08 |
| 0.2000 | 29.1557 | 70.8443 | 105.9122 | 176.7565 | 166.3868 | 6.52/8.08 | 40.08 | 59.92 |
| 0.2100 | 30.6164 | 69.3836 | 92.2031 | 161.5867 | 152.1069 | 6.52/8.08 | 42.94 | 57.06 |
| 0.2200 | 32.0771 | 67.9229 | 81.2358 | 149.1586 | 140.4080 | 6.52/8.08 | 45.54 | 54.46 |

Note: The pounds of wine made is less than the pounds of starting juice, due to carbon dioxide loss during the fermentation.

EXAMPLE NUMBER 1

Twenty-eight (28) liters of San Joaquin Valley white grape juice consisting of a mixture of grape varieties was used for a controlled test of the process. The twenty-eight (28) liters was divided into two lots. Lot #1 contained twelve (12) liters, and lot #2 contained sixteen (16) liters. Lot #2 was used as the control. The laboratory analysis of both lots of juice shows: Brix 20.2, total acidity 0.72 gram/100 ml, pH 3.43, invert sugar weight fraction 0.2045.

The 12 liters (lot #1) of grape juice was blended with 4 liters of condensate (the low-sugar grape juice fraction). The condensate was obtained from a three stage, two effect grape juice evaporator. In this evaporator, fresh grape juice is fed into stage number one (1), and concentrated to about twenty-six (26) percent by weight invert sugar. The condensate is collected. The twenty-six (26) percent by weight material then goes to stage number two (2) where it is concentrated to about fifty-five (55) percent invert sugar. The condensate is collected. In stage number three (3), the grape juice reaches about sixty-seven (67) percent invert sugar. The condensate is collected. Other grape juice evaporator designs can be used such as those manufactured by L & A Process Systems, Inc. or GSE Corporation. A more complete technical discussion of evaporators can be found in "Chemical Engineers' Handbook", Fifth Edition, by Perry and Chilton, pages 11–27 through 11–38.

Laboratory analysis on the resultant sixteen (16) liters of blended grape juice was 15.0 Brix, and 0.152 weight fraction of invert sugar. This blended grape juice will be referred to as lot #3.

Lot #2 and lot #3 were inoculated with yeast culture, and fermented into wine at 55 degrees Fahrenheit. Upon completion of the fermentation process, the wines were finished and filtered using commonly accepted wine-making practices as approved by the BATF. The resultant wine analysis is shown in Table VIII.

TABLE VIII

|  | Lot #2 (Control) | Lot #3 (Low-Alcohol) |
|---|---|---|
| Alcohol, Volume Percent | 12.53 | 9.34 |
| Alcohol, Weight Percent | 10.21 | 7.56 |
| Total Acidity, grams/100 ml | 0.64 | 0.54 |
| Sugar, grams/100 ml | 0.20 | 0.13 |
| pH | 3.52 | 3.44 |

Total Acidity was calculated as tartaric acid.

This procedure resulted in the production of a high quality light wine with less alcohol and calories than the control wine. A panel of experienced tasters evaluated the wines. This panel found that lot #2 wine and lot #3 wine to have very similar sensory characteristics.

EXAMPLE NUMBER 2

Twenty-six and one-half (26.5) liters of San Benito County Chardonnay grape juice was used for a controlled test of the process. The twenty-six and one-half (26.5) liters was divided into two lots. Lot #4 contained ten and one-half (10.5) liters, and lot #5 contained sixteen (16) liters. Lot #5 was used as the control. The laboratory analysis of both lots of juice showed: Brix 22.8, total acidity 0.83 gram/100 ml, pH° 3.56, invert sugar weight fraction 0.231.

The ten and one-half (10.5) liters of grape juice (lot #4) was blended with five and one-half (5.5) liters of condensate (the low-sugar grape juice fraction). The condensate was obtained from a three stage, two effect grape juice evaporator. In this evaporator, fresh grape juice is feed into stage number one (1), and concentrated to about twenty-six (26) percent by weight invert sugar. The condensate is collected. The twenty-six (26) percent by weight material then goes to stage number two (2) where it is concentrated to about fifty-five (55) percent invert sugar. The condensate is collected. In stage number three (3), the grape juice reaches about sixty-seven (67) percent invert sugar. The condensate is collected.

Laboratory analysis on the resultant sixteen (16) liters of blended grape juice was 15.0 Brix, and 0.152 weight fraction to invert sugar. This blended grape juice will be refereed to as lot #6.

Lot #5 and lot #6 were inoculated with yeast culture, and fermented into wine at 55 degrees Fahrenheit. Upon completion of the fermentation process, the wines were finished and filtered using commonly accepted wine-making practices as approved by the BATF. The resultant wine analysis is shown in Table IX.

TABLE IX

|  | Lot #5 (Control) | Lot #6 (Low-Alcohol) |
|---|---|---|
| Alcohol, Volume Percent | 13.56 | 9.00 |
| Alcohol, Weight Percent | 11.07 | 7.28 |
| Total Acidity, grams/100 ml | 0.75 | 0.59 |
| Sugar, grams/100 ml | 0.40 | 0.12 |
| pH | 3.68 | 3.46 |

Total Acidity was calculated as tartaric acid.

This procedure resulted in the production of a high quality light wine with less alcohol and calories than the control wine. A panel of experienced tasters evaluated the wines. This panel found that lot #5 wine and lot #6 wine to have very similar sensory characteristics.

EXAMPLE NUMBER 3

Twenty-three and one-half (23.5) liters of Monterey County Cabernet Sauvignon grape must was used for a controlled test of the process. The purpose of example number 3 is to demonstrate that the process will make a light red wine. The twenty-three and one-half (23.5) liters was divided into two lots. Lot #7 contained nine and one-half (9.5) liters, and lot #8 contained fourteen (14) liters. Lot #8 was used as the control. The laboratory analysis of both lots of must showed: Brix 20.6, total acidity 0.74 gram/100 ml, pH 3.63, invert sugar weight fraction 0.208.

The nine and one-half (9.5) liters of red must (lot #7) was blended with four and one-half (4.5) liters of condensate (the low-sugar red must fraction). The condensate was obtained in exactly the same way as stated in examples number 1 and 2.

Laboratory analysis on the resultant fourteen (14) liters of blended red must was 14.0 Brix, and 0.142 weight fraction of invert sugar. This blended red must will be referred to as lot #9.

Lot #8 and lot #9 were inoculated with yeast culture, and fermented into wine at 70 degrees Fahrenheit. Twice daily during the course of fermentation, the cap of the grape skins was thoroughly mixed with the fermenting wine to promote color and flavor extraction. Upon completion of the fermentation process, the wines were finished and filtered using commonly accepted wine-making practices as approved by the BATF. The resultant wine analysis is shown in Table X.

TABLE X

|  | Lot #8 (Control) | Lot #9 (Low-Alcohol) |
|---|---|---|
| Alcohol, Volume Percent | 11.16 | 7.34 |
| Alcohol, Weight Percent | 9.07 | 5.91 |
| Total Acidity, grams/100 ml | 0.73 | 0.59 |
| Sugar, grams/100 ml | 0.37 | 0.23 |
| pH | 3.50 | 3.42 |

Total Acidity was calculated as tartaric acid.

This procedure resulted in the production of a light wine with less alcohol and calories than the control wine.

EXAMPLE NUMBER 4

Reconstituted white grape juice was used in a controlled test to demonstrate that "freeze concentration" could be utilized to separate the grape juice into a low and high-sugar fraction. "Freeze concentration" is also referred to as "crystallization", and a more complete technical discussion can be found in "Chemical Engineers' Handbook", Fifth Edition, by Perry and Chilton, pages 17–18 through 17–25.

To get white grape juice from concentrate, four (4.0) liters of white grape juice concentrate was diluted with water to produce sixteen (16) liters of white grape juice. The laboratory analysis of the sixteen (16) liters of resultant juice showed: Brix 22.3, total acidity 0.50 gram/100 ml, pH 3.86, and invert sugar weight fraction of 0.226. The sixteen (16.0) liters was divided into two lots. Lot #10 contained eight and one-half (8.5) liters of grape juice, and lot #11 contained seven and one-half (7.5) liters. Lot #10 was used as the control.

The seven and one-half (7.5) liters of grape juice (lot #11) was placed in a freezer overnight, and frozen. It was then allowed to thaw at room temperature, and during the thawing process seven (7) aliquot of liquid grape juice were recovered. The first three (3) lots recovered were blended to produce a single lot of three and one-tenth (3.1) liters of the low-sugar grape juice. This lot is identified as lot #12. Laboratory analysis on the resultant three and one-tenth (3.1) liters of blended grape juice (lot #12) was 13.8 Brix, total acidity 0.30 gram/100 ml, pH 3.90, and 0.140 weight fraction of invert sugar.

One (1) liter of lot #10 and lot 12 were inoculated with yeast culture, and fermented into wine at 55 degrees Fahrenheit. Upon completion of the fermentation process, the wines were finished and filtered using commonly accepted wine-making practices as approved by the BATF. The resultant wine analysis is shown in Table XI.

TABLE XI

| | Lot #10 (Control) | Lot #12 (Low-Alcohol) |
|---|---|---|
| Alcohol, Volume Percent | 12.20 | 7.21 |
| Alcohol, Weight Percent | 9.93 | 5.81 |
| Total Acidity, grams/100 ml | 0.69 | 0.47 |
| Sugar, grams/100 ml | 0.55 | 0.28 |
| pH | 3.70 | 3.37 |

Total Acidity was calculated as tartaric acid.

This procedure resulted in the production of light wine with less alcohol and calories than the control wine.

While preferred embodiments have been shown and described, various modifications and substitutions may be made without departing from the spirit and scope of the invention. Accordingly, it is to be understood that the present invention has been described by way of example and not by limitation.

I claim:

1. A process for the production of a low-alcohol wine comprising the steps of:

separating grape juice prior to fermentation and without further processing steps into a higher-sugar fraction having more sugar on a % weight basis than the grape juice and a low-sugar fraction, said low sugar fraction having only a trace of sugar and including organic compounds which provide the wine with full body, aroma and character;

blending additional grape juice into the low-sugar fraction to form a fermentable mixture, said additional grape juice providing the sugar for fermentation and fermenting the mixture to produce the low-alcohol wine.

2. The process of claim 1 wherein the separation step is carried out by a process selected from the group consisting of evaporation, freeze concentration, thin film evaporation under reduced pressure and reverse osmosis.

3. The process of claim 2 wherein the separation step is carried out by evaporation.

4. The process of claim 3 wherein the evaporation is carried out in a three stage, two step evaporator.

5. The process of claim 1 wherein the low-alcohol wine is a red wine and prior to the step of separating the grape juice the process further includes the steps of:

providing a red must comprising grape skins containing red color pigments, grape juice, water and invert sugar;

treating the red must with heat and an extraction agent to extract the red color pigments from the grape skins, and separating the grape juice from the must.

6. A process for the production of a low-alcohol red wine comprising the steps of:

separating must prior to fermentation and without further processing steps into a high-sugar fraction having more sugar on a % weight basis than the must and a low-sugar fraction, said low sugar fraction having only a trace of sugar and including organic compounds which provide the wine with full body, aroma and character;

blending additional must into the low-sugar fraction to form a fermentable mixture, said additional must providing sugar for fermentation and fermenting the mixture to product low alcohol red wine.

7. The method of claim 1 wherein the low sugar fraction comprises from about 0.0003 to about 0.0005 weight fraction of sugar.

8. The method of claim 6 wherein the low sugar fraction comprises from about 0.0003 to about 0.0005 weight fraction of sugar.

* * * * *